United States Patent [19]

Scharf

[11] Patent Number: 4,773,923

[45] Date of Patent: Sep. 27, 1988

[54] PROCESS AND APPARATUS FOR FRACTIONAL DESUBLIMATION OF VAPOR-PHASE SOLIDS FROM GAS-VAPOR MIXTURES

[75] Inventor: Helmut Scharf, Schermbeck, Fed. Rep. of Germany

[73] Assignee: Huels Aktiengesellschaft, Marl, Fed. Rep. of Germany

[21] Appl. No.: 13,184

[22] Filed: Feb. 9, 1987

Related U.S. Application Data

[63] Continuation-in-part of Ser. No. 819,553, Jan. 17, 1986, abandoned.

[30] Foreign Application Priority Data

Jan. 17, 1985 [DE] Fed. Rep. of Germany ....... 3501371

[51] Int. Cl.$^4$ ................................................. F25J 5/00
[52] U.S. Cl. ................................................. 62/12; 55/82; 55/269
[58] Field of Search .................... 62/12; 55/82, 269

[56] References Cited

U.S. PATENT DOCUMENTS

| | | | |
|---|---|---|---|
| 4,080,182 | 3/1978 | Vitovec et al. | 55/269 |
| 4,181,508 | 1/1980 | Schmid et al. | 55/82 |
| 4,281,518 | 8/1981 | Muller et al. | 62/12 |
| 4,528,006 | 7/1985 | Vitovec et al. | 55/82 |

FOREIGN PATENT DOCUMENTS

| | | |
|---|---|---|
| 1108663 | 6/1961 | Fed. Rep. of Germany . |
| 1544129 | 9/1976 | Fed. Rep. of Germany . |
| 2617595 | 5/1985 | Fed. Rep. of Germany . |
| 2082822 | 12/1971 | France . |
| 1081579 | 8/1967 | United Kingdom . |
| 1549713 | 8/1979 | United Kingdom . |

Primary Examiner—Ronald C. Capossela
Attorney, Agent, or Firm—Millen & White

[57] ABSTRACT

For the non-clogging, fractional desublimation of vapor-phase solids contained in a gas-vapor mixture, the gas-vapor mixture, exiting at high velocity from a nozzle, is mixed with a cooling gas, likewise exiting at high velocity from another nozzle. The gas-vapor mixture and the cooling gas flow toward each other, the axes of the two gaseous streams being a straight line. Fractional desublimation of the solids is attained by adjustment of flows leading to the regulation of the temperature and residence time of the cooled gas-vapor mixture. This desublimation system is capable of degrees of efficiency and solids purities higher than 99%.

25 Claims, 2 Drawing Sheets

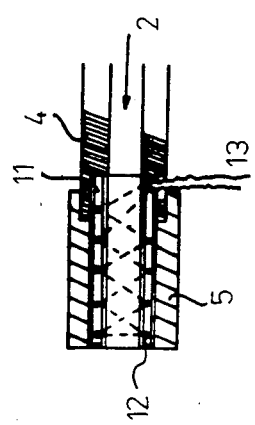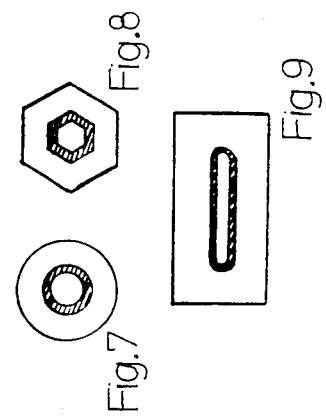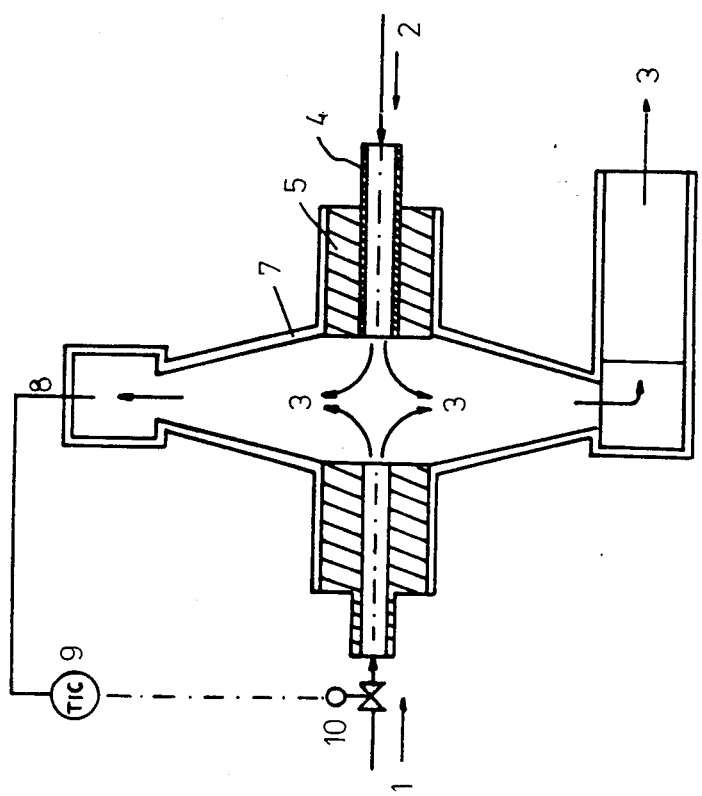

PROCESS AND APPARATUS FOR FRACTIONAL DESUBLIMATION OF VAPOR-PHASE SOLIDS FROM GAS-VAPOR MIXTURES

This application is a continuation-in-part, of application Ser. No. 819,553, filed Jan. 17, 1986 now abandoned.

BACKGROUND OF THE INVENTION

This invention relates to a desublimation, especially fractional desublimation, process and apparatus therefor. Desublimation is defined as the direct phase change of a vapor into a solid, i.e., without passing through a liquid phase.

In the production of inorganic and organic solids, sometimes solids are initially obtained in the vapor phase in a non-desublimable carrier gas and are subsequently subjected to fractional desublimation by indirect heat transfer on cooling jacket surfaces or the like. These processes require large cooling surfaces. Because desublimed solids adhere and accumulate on the walls, the resultant heat transfer characteristics of the wall surface are changed in an uncontrollable manner, resulting in a variation in solids quantities and qualities, and a relatively rapid clogging of the apparatus. For this reason, scraping devices are frequently employed in the apparatuses, but such devices are expensive both to purchase and maintain, and when out of service, lead to down-time of the desublimation system.

An alternative desublimation system relies on the direct cooling of the gas-vapor mixture with coolants present in the gaseous phase under the conditions of desublimation. Thus, for example, according to British Pat. No. 1,081,579, water, as a preferred coolant, is introduced under pressure via nozzles into the gas-vapor mixture and vaporized therein. However, in this process, besides the desired solid product, solid by-products are also deposited on the water droplets before the droplets are entirely vaporized, so that fractional desublimation is substantially impeded. When water is employed as the coolant, the process is likewise unsuitable for the desublimation of substances sensitive to water, such as, for example, acid anhydrides. Since the walls of the desublimator are heated on the one hand, and the residence time of the gas-vapor-liquid mixture in the desublimation zone is very long on the other hand, some of the coolant is also heated by the walls, thereby requiring large quantities of coolant for the process. This is especially the case when using cooling fluids having lower heats of evaporation than water or when using gases. In addition gas is introduced at the bottom of the desublimator. Accordingly, this also adds to coolant load as well as increasing the amount of resultant waste gas.

In a process according to German Pat. No. 1,108,663, a carrier gas, freed of product, is recycled via coolers and mixed with the product-containing gas. Simultaneously, liquid product is injected into the mixing chamber. Fractional desublimation is thereby difficult to perform. In French No. 2,082,822, it is suggested to conduct desublimation with air in two series-connected pipes to obtain improved deposition of the solid on the pipe walls and to gain a purer solid. This process requires extraordinary large cooling surfaces for an industrial scale installation, and in any case, the pipes would be relatively rapidly plugged by the deposited solids.

A similar process is described in German Pat. No. 2,617,595 wherein cooling of the gas-vapor mixture is conducted with both cooling gases and cooled pipes equipped with scraper means. The finely dispersed portion of the product stream is then recycled in this expensive and maintenance-intensive system, and, in any case, fractional desublimation is relatively infeasible.

Still another desublimation process is described in German Pat. No. 1,544,129 wherein the carrier gas containing the vapor-phase solid, and the cooling gas form two gaseous cylindrically-shaped flow patterns rotating coaxially in the same direction and moving axially in opposite directions, and wherein the desublimed solid is discharged from the desublimator together with an additional portion of the cooling gas. For this process, a very large quantity of cooling gas must be employed to prevent the gas-vapor mixture as well as the desublimed solid from coming into contact with the wall and in order to discharge the desublimed solid. Fractional desublimation is substantially impeded in this process because it is necessary for obtaining the desired flow pattern and movement of the gases to prevent them from complete intermingling. A large radial temperature gradient is present in the gaseous phase which extends from the temperature of the carrier gas to the temperature of the cooling gas. Therefore, normally the by-products are desublimed too.

In U.S. Pat. No. 4,281,518 a process and a device are described for separating a vaporous substance (e.g., sulfur dioxide vapor) from air by means of a liquefied inert gas, e.g., liquid nitrogen (the reference mentions using "liquid or cold inert gas" but apparently liquefied inert gas is the preferred coolant). The air-containing vapor and the liquefied inert gas are injected into the device through inlets which are aligned with one another. The substance to be separated hereby accumulates first as "snow", i.e., as a solid, and then is melted to a liquid. The temperature of the injected liquefied inert gas is always in the range of the condensation temperature of this gas; this temperature cannot be set at arbitrary values above the condensation temperature. Thus, the process for practical purposes is limited to the simultaneous separation of all substances which, down to the temperature of the injected liquefied inert gas, are converted from the vaporous condition to the liquid or solid condition. Separating of different vaporous substances during the separation process itself is practically impossible with this procedure since the desired vaporous substance and all by-products are simultaneously desublimated.

In U.S. Pat. No. 4,528,006 a device is described in which a vapor-gas mixture is cooled by means of an injected liquid, whereby the vaporous solid desublimates. The vapor-gas mixture and the liquid are injected into the device through inlets at the top of the device which are aligned with one another. In addition, liquid is sprayed into the device from the side whereby the nozzles for the liquid to be sprayed in from the side are attached to the device at various heights. The inside wall is designed so as to be permeable to gas and an additional gas constantly passes through this permeable wall so that the desublimated solid does not settle on the inside wall of the container. Since in this process, as well as that of U.S. Pat. No. 4,281,518, the vapor-gas mixture is cooled by a vaporizable liquid (e.g., water), in this process all substances that can be desublimated, which are contained in the vapor-gas mixture (in other words, the desired vaporous substance and all by-products) are simultaneously desublimated.

SUMMARY OF THE INVENTION

An object of this invention, therefore, is to provide a process and apparatus for the fractional desublimation of solids from gas-vapor mixtures by direct cooling of the gas-vapor mixture with cooling gases, and especially a system wherein a substantially clean separation of the primary product from desublimable by-products is achieved with little or no clogging occuring in the desublimator.

Upon further study of the specification and appended claims, further objects and advantages of this invention will become apparent to those skilled in the art.

To attain these objects, the desublimation is conducted by very rapid mixing of the gas-vapor mixture with the cooling gas, the desublimation being generally completed in a sufficiently short time period before the desublimed solids in the mixed gaseous stream can come into any substantial contact, if at all, with vessel walls, and wherein the quantity and the temperature of the cooling gas are regulated so that the temperature of the mixed gas is maintained below the sublimation temperature of the desired solid and above the sublimation temperature of the by-products.

As an embodiment of this invention, jet cooling is provided whereby the sublimable stream and the coolant stream are passed at high velocities through coaxial opposing nozzles whose exit planes are substantially perpendicular to the nozzle axis into a mixing zone. The velocities and resultant rates of cooling are regulated so that the desired solids are entirely desublimed at the sublimation temperature, before any substantial contact of the gas-vapor mixture with the walls of the desublimator. In this connection, this invention takes advantage of the finding that many desublimable compounds can desublime from the gaseous phase in an extraordinarily brief time. Thus, it has been found in the process of this invention that pyromellitic dianhydride, for example, completely desublimes within $10^{-4}$ second.

The rapid cooling of the gas-vapor mixture can be attained according to the invention by accelerating the gas-vapor stream through a nozzle to a velocity of about 10 to 200 m/s (meters per second). Flow velocities of below 10 m/s are also possible, but at lower velocities, all things being equal, a less pure solid is obtained. (The degree of contamination of the solid is, of course, also dependent on the difference between the sublimation temperature of the desired solids and the sublimation temperature of the by-products.) Preferably, the flow velocities are higher than 10 m/s, and wherein the sublimation temperatures of the solid and of the by-products are in very close proximity to each other, as is the case, for example, with pyromellitic dianhydride, preferred flow velocities of the gas-vapor mixture are higher than 30 m/s.

If the velocities of the two gases are too low, the intermingling of the gases is incomplete and takes a long time. This results in temperature differences within the desublimation zone causing desublimation of by-products which as well affects the purity of the sublimed product.

Although, with an increasing flow velocity and resultant shortened cooling period, the desublimed solid becomes cleaner, an industrially practical upper limit for the velocity does exist since with increasing flow velocity, the desublimed solid particles become increasingly smaller and must be separated with finer filters from the gaseous stream. Additionally, at very high flow velocities, correspondingly high pressures must be provided upstream of the nozzle, causing additional expenses. For these reasons, flow velocities of the gas-vapor mixture lower than about 200 m/s are considered industrially acceptable, and velocities of smaller than 160 m/s are preferred.

The velocity of the cooling gas is likewise about 10-200 m/s, preferably 20-100 m/s.

Suitable cooling gases for the process of this invention are compounds which exist in the gaseous or vapor phase under the desublimation conditions and which do not react with the vapor-phase solid. Primarily suited are gases such as, for example, nitrogen, oxygen, carbon dioxide, carbon monoxide and mixtures of these gases. Air is particularly preferred as the cooling gas. The temperature of the cooling gases should be as low as practicable since the required amount of cooling gas is proportional to the temperature of the gas. Preferred are gases at ambient temperature, e.g., 20–30° C. However, it is also possible to utilize gases having a higher temperature, such as, for example, air heated by the required compression step. Conversely, gases and vapors having a temperature below room temperature can also be employed. However, since cooling energy is normally expensive, this is less practical industrially.

The difference between the desublimation temperature and the temperature of the cooling gas depends on the sublimation temperature and heat of sublimation of the product itself and on further processing conditions.

The temperature of the gas-vapor mixture prior to the desublimation step is preferably at least 3° C., especially at least 5° C. above the sublimation temperature of the product in the gas-vapor mixture.

Another aspect of this invention relates to an apparatus for the fractional desublimation of vapor-phase solids from the gas-vapor mixture with a cooling gas, wherein the desublimator comprises coaxial opposing, spaced apart nozzles, preferably having the same orifice cross sections, in which one nozzle is used for the gas-vapor mixture and the other nozzle is used for the cooling gas. The nozzle orifice cross section can have the form of, for example, a closed curve, e.g., a circle or ellipse, polygon or a slot with the corresponding diameter, diagonal or slot width being preferably about 2–12 mm, especially 4–8 mm. A circular orifice is preferred since it produces a gas jet that is uniform with respect to the marginal zones thereof. In the case of the polygonal nozzle, a square, rectangular or hexagonal cross section is preferred. The specific size of the nozzle orifice depends on the desired throughput of gas-vapor mixture or cooling gas and on the desired flow velocity. Nozzles having a diameter smaller than 2 mm, though feasible, do not afford any technical advantages.

The upper limit for the diameter also depends on the desired purity of the product. The mixture made up of gas-vapor mixture and cooling gas must initially escape perpendicularly to the two individual streams from the desublimation zone. The amount of this mixture, with the flow velocity being the same, increases to the second power with the radius of the nozzles. Thus, it can readily be understood that, as the quantity of the gas-vapor mixture and of the cooling gas increases, the intermixing of the two individual streams will decrease. The gas-vapor-solid mixture in the center of the mixing zone comes into contact with more cooling gas on its way from the center to the outer regions.

The optimum throughputs vary from one solid to the next and also depend on the difference of the sublimation temperatures of solid and by-products, so that a general upper limit for the nozzle diameter cannot be given. Nozzle diameters of up to 12 mm and, in particular, those of 4–8 mm, are preferred for solids wherein the sublimation temperatures range in the proximity of the sublimation temperatures of the by-products and wherein the purity demands are high, such as, for example, in the case of pyromellitic dianhydride where the temperature difference is only a few degrees and the required degree of purity is about 99%. The same criteria apply analogously to nozzles having a polygonal cross section in order to determine the optimum width, length or diagonal of such cross sections.

The nozzle length (length of constricted cross section) is relatively unimportant except that since pressure losses increase with increasing nozzle length, shorter nozzles are preferred. Thus, short nozzles in the form of perforated plates are suitable, and in any case nozzles having a duct length of about 5–30 mm proved to be particularly suitable.

The wall at the nozzle exit point for the gas-vapor mixture must be maintained at a temperature higher than the sublimation temperature of the solid in the gas-vapor mixture; otherwise, solids would be desublimed at this point and would grow in a substantially tubular configuration, for example, from this location into the desublimation zone, finally leading to clogging. Various temperature regulating techniques can be used, the simplest being to cool the gas-vapor mixture prior to its entrance into the nozzle only to such an extent that its temperature is adequate for maintaining the temperature of the wall at the nozzle orifice at the desired level. Since a higher temperature of the gas-vapor mixture will otherwise require a correspondingly high amount of cooling gas, the temperature of the gas-vapor mixture upstream of the nozzle inlet should be as low as possible. This is attained according to this invention by providing that the internal wall of the nozzle consists essentially of a material that readily conducts heat, such as, for example, copper, silver, or aluminum so that the heat required at the nozzle orifice is not only supplied by the gas-vapor mixture at this location, but also from the back part of the nozzle. Another possibility according to this invention resides in heating the nozzle, e.g., by incorporating electric heating elements therein.

According to a preferred embodiment of the invention, the nozzle for the gas-vapor mixture is provided with collar means, this collar means, i.e., a substantially enlarged ring or the like, which can also take the form of a ridge or step, extending axially outwardly from the nozzle orifice, enables a portion of the already somewhat cooled gaseous stream to circulate within the collar zone so that the solid particles contained in this stream can serve as desublimation nuclei.

The radial spacing of the collar from the center of the nozzle orifice depends on the diameter and configuration of the nozzle, and on the velocity of the gas-vapor mixture stream. Normally, this spacing is between 4 and 16 mm from the axis of the nozzle. In case of smaller or larger spacings, possible in principle, the collar loses some of its efficiency. The axial width of the collar, on the other hand, is preferably about 4 to 20 mm, especially 8 to 12 mm.

The spacing between the nozzles for the gas-vapor mixture and for the cooling gas is dependent on: the solid to be desublimed, the desired purity, the desired particle size of the thus-separated particles, and on the flow velocities of the two gaseous streams, so that in an individual case the optimum spacing must be determined empirically. The spacing can be about 2–100 mm for solids having a high desublimation rate and/or high purity requirements, such as, for example for pyromellitic dianhydride. Spacings of 20–50 mm are normally preferred.

The nozzle arrangement within the housing is optional insofar as the dimensions of the nozzles and the spacing between them as stated above are observed.

Under practical conditions, the amounts of gas-vapor mixture constitute a multiple of the throughput of a single nozzle having the above-mentioned dimensions. This is accomplished by providing a corresponding number of nozzles wherein the gas-vapor stream is distributed among the required number of juxtaposed and/or superimposed nozzles. Another, and preferred, adaptation of the nozzles to the total throughput of gas-vapor mixture and cooling gas resides in using slot nozzles wherein the width of the slot corresponds to the diameter of a round nozzle, and wherein the length of the slot depends on the desired gas throughput.

The process of this invention has the advantage that it is very simple and permits clean separation of the desired solid from the likewise desublimable by-products, so that a very pure solid is obtained with a practically quantitative yield. The drawbacks connected with the spraying in of vaporizable liquids as coolants are avoided; this includes not only the separation of the desired product simultaneously with the undesired by-products on the coolant, which is initially present as liquid droplets with low temperature, but also a possible reaction between the vaporizable liquid and the desublimated product (e.g., the partial hydrolysis of an acid anhydride by water sprayed in as coolant). In the process according to the invention the vapor-gas mixture and the cooling gas mix very quickly and uniformly as a result of which a quite uniform temperature develops in the separating chamber.

Furthermore, the apparatus of this invention is also relatively simple, contains no moving parts, requiring no thermostated wall surfaces as in the prior art, and does not tend to clog. Owing to the simplicity of the process and the apparatus, a relatively maintenance-free, low cost operation is provided.

BRIEF DESCRIPTION OF THE DRAWINGS

Various other objects, features and attendant advantages of the present invention will be more fully appreciated as the same becomes better understood when considered in connection with the accompanying drawings, in which like reference characters designate the same or similar parts throughout the several views, and wherein

FIG. 5 is a schematic cross section of a nozzle pair included in a desublimator.

FIG. 6 shows a heated nozzle in longitudinal section; and

FIGS. 7–9 illustrate exemplary cross sections of the nozzle wherein the cross sections have a circular, hexagonal, or slot shape, respectively.

DETAILED DESCRIPTION OF DRAWINGS

Figure 1:
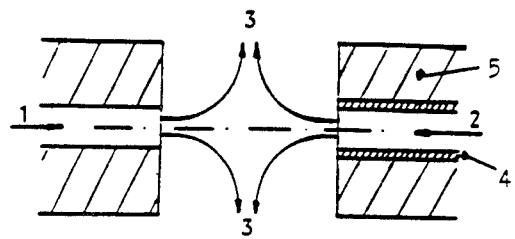
FIGS. 1–4 illustrate several suitable arrangements of nozzle pairs.

FIG. 1 shows an arrangement of two circular nozzles, of which only the outlet ends are illustrated. The axes of both nozzles lie on a straight line. The cooling gas flows through the nozzle 1, the gas-vapor mixture through the nozzle 2. Nozzle 2 has an internal wall 4 of a heat-conductive material, surrounded by a heat-insulating layers.

The two gas jets collide in the space between the nozzles and leave this space—after intermixing and cooling of the gas-vapor mixture—in a flow 3 oriented essentially perpendicularly to the nozzle axis.

Figure 2:
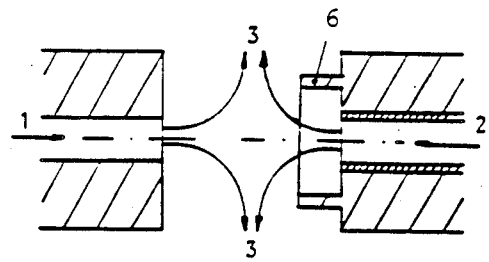

FIG. 2 shows a nozzle arrangement wherein the nozzle for the gas-vapor mixture has a collar 6.

Figure 3:
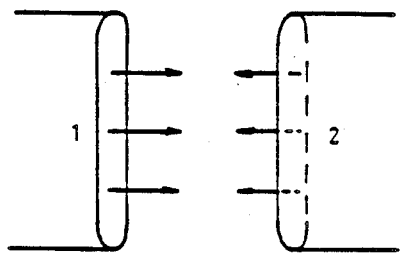

FIG. 3 shows the arrangement of two slot nozzles opposing each other throughout their entire cross sections.

Figure 4:
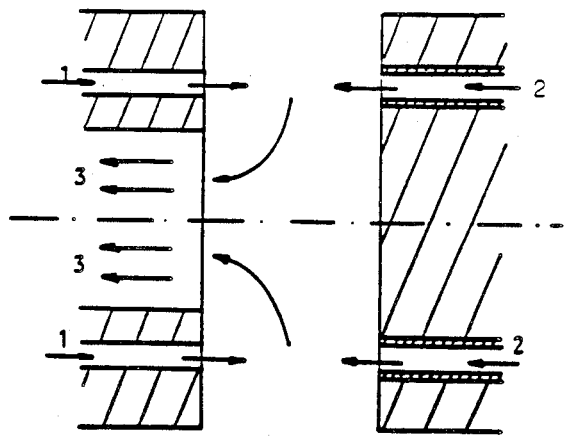

FIG. 4 shows the arrangement of two annular slot nozzles, the axes of which lie on a straight line. In this arrangement, the mixture 3 of cooling gas, cooled-off gas-vapor mixture and desublimed solid matter leaves the arrangement through the cooling gas nozzle which is equipped with a large duct on the inside.

FIG. 5 is a more comprehensive embodiment wherein the cooling gas flows through nozzle 1 and the gas-vapor mixture through nozzle 2. The two gas jets meet in the space between the nozzles and escape from this space—after thorough mixing and cooling of the gas-vapor mixture—via a current 3, which is directed substantially perpendicular to the nozzle axis. The mixture in current 3, consisting essentially of cooling gas, cooled gas-vapor mixture and desublimated solids, is collected in a tube ring, i.e., an annular chamber from which it is passed to the gas-solid separator device. The annular chamber is fastened to the outside of housing 7.

In the annular chamber the gas temperature is measured by a temperature measuring device (e.g., by a thermoelement) according to a known process. The measuring device is connected by pipe 8 with thermostat 9 which acts on control valve 10. By the control valve the amount of injected cooling gas is regulated, as a result of which the temperature of gas mixture 3 is kept constant.

The desublimated solids are separated from the gas by one of any conventional gas-solid separator means, especially any known to be useful in the separation of phthalic anhydride and the like. For a general reference relating to gas-solid separators, see Perry and Chilton: *Chemical Engineer's Handbook*, 5th Edition (1973) pps. 20-78 through 20-118. The particular gas-solids separator means which is employed for separating desublimated solids from the gas does not constitute an aspect of the present invention.

FIG. 6 shows a heated nozzle 2 for the gas-vapor mixture. At the end of metal pipe 4 a metal sleeve 11 is attached which contains a coil 12 made of a resistance wire, a coil which is electrically heated by connections 13. The metal sleeve is surrounded on the outside by a heat-insulating layer 5.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight; unless otherwise indicated. In the following examples, pyromellitic dianhydride was the solid in the gas-vapor mixture to be sublimed. The gas-vapor mixture in this case was the reaction gas from the manufacture of the pyromellitic dianhydride by air oxidation of tetraalkyl benzenes.

EXAMPLES 1-15

A gas-vapor mixture containing pyromellitic dianhydride (PMDA) was produced by air oxidation of tetraalkyl benzenes. The gas-vapor mixture contained about 0.6% of PMDA and as by-products from which PMDA had to be separated, about in total 0.2% by weight of trimelitic anhydride, methylisopropylphthalic anhydride, dimethylphthalic anhydride, and a number of other compounds, present only in very minor amounts, such as aldehydes and quinones. The main quantity of gas-vapor mixture constituted of about nitrogen and oxygen and minor amounts of steam, carbon monoxide, and carbon dioxide. From this gas-vapor mixture, having an orifice outlet temperature of 230° C., PMDA was desublimed, using the nozzle arrangement illustrated in FIG. 1, with air (room temperature) being employed as the cooling gas. The gas velocities were adjusted at a given gas throughput over the nozzle cross section. The purity of the thus-separated PMDA was determined by gas chromatography after esterification of the PMDA, and the size distribution of the thus-desublimed PMDA particles was measured with a cascade impactor and, in individual cases, by means of reflection electron microscope (REM) photomicrographs.

EXAMPLES 16-18

In desublimation tests 16-18, the nozzles of a nozzle pair exhibited differing cross sections. The remaining conditions corresponded to those in Examples 1-15.

EXAMPLES 19-23

For the experiments of Examples 19-23, a nozzle arrangement was utilized corresponding to FIG. 2, with a collar in front of the nozzle for the gas-vapor mixture. The width of the collar was 10 mm and the diameter was 25 mm. The remaining conditions corresponded again to those of Examples 1-15.

The results of the examples are compiled in Table 1. The degree of efficiency of desublimation, expressed as the ratio of desublimed PMDA/total amount of PMDA, was in all cases higher than 99%. The PMDA purity was also above 99%. The by-products of PMDA had remained in the gaseous phase. The gaseous phase was analyzed for PMDA after desublimation.

According to Examples 16-18 satisfactory results are obtained even if the cross-sections of the two nozzles are different from each other as long as the opposing nozzles are aligned coaxially.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

TABLE 1

DESUBLIMATION OF PYROMELLITIC DIANHYDRIDE WITH AIR AS COOLING GAS

| Example No. | Nozzle Spacing mm | Nozzle Diameter a/b mm | Velocity Gas-Vapor Mixture m/s | Velocity Air m/s | \multicolumn{10}{c}{Particle Size Distribution of PMDA (% by Weight), d = Average Diameter d (μm)} | | | | | | | | | |
|---|---|---|---|---|---|---|---|---|---|---|---|---|---|---|
| | | | | | 0.64 | 1.1 | 1.7 | 2.5 | 3.4 | 4.3 | 5.7 | 7.7 | 18 | 27 |
| 1 | 3 | 4/4 | 154 | 84 | 3 | 14 | 9 | 31 | 25 | 6 | 8 | 1 | 2 | 1 |
| 2 | 10 | 4/4 | 154 | 84 | 4 | 9 | 13 | 34 | 25 | 7 | 3 | 2 | 2 | 1 |
| 3 | 20 | 4/4 | 154 | 84 | 3 | 9 | 6 | 28 | 35 | 11 | 4 | 1 | 2 | 1 |
| 4 | 40 | 4/4 | 154 | 84 | <1 | 2 | 1 | 4 | 16 | 27 | 42 | 4 | 3 | 1 |
| 5 | 3 | 5.6/5.6 | 79 | 43 | <1 | 1 | 2 | 3 | 9 | 20 | 38 | 11 | 11 | 5 |
| 6 | 20 | 5.6/5.6 | 79 | 43 | <1 | 3 | 2 | 9 | 19 | 15 | 15 | 16 | 16 | 3 |
| 7 | 40 | 5.6/5.6 | 79 | 43 | <1 | 1 | 2 | 2 | 3 | 12 | 58 | 16 | 8 | 3 |
| 8 | 3 | 8/8 | 39 | 21 | <1 | <1 | 1 | 1 | 6 | 12 | 26 | 15 | 23 | 14 |
| 9 | 10 | 8/8 | 39 | 21 | 1 | 3 | 2 | 2 | 7 | 12 | 18 | 9 | 13 | 31 |
| 10 | 20 | 8/8 | 39 | 21 | <1 | <1 | <1 | <1 | 1 | 7 | 22 | 20 | 25 | 25 |
| 11 | 40 | 8/8 | 39 | 21 | <1 | <1 | 1 | 1 | 2 | 3 | 14 | 17 | 31 | 31 |
| 12 | 3 | 12/12 | 17 | 10 | 1 | 2 | 2 | 1 | 4 | 18 | 45 | 13 | 10 | 4 |
| 13 | 10 | 12/12 | 17 | 10 | 3 | 17 | 15 | 3 | 2 | 4 | 8 | 19 | 23 | 6 |
| 14 | 20 | 12/12 | 17 | 10 | 16 | 32 | 12 | 5 | 5 | 5 | 5 | 6 | 8 | 6 |
| 15 | 40 | 12/12 | 17 | 10 | 4 | 8 | 14 | 8 | 7 | 7 | 9 | 16 | 20 | 7 |
| 16 | 20 | 5.6/8 | 79 | 21 | <1 | 1 | 1 | 1 | 2 | 32 | 36 | 13 | 7 | 7 |
| 17 | 20 | 4/8 | 154 | 21 | <1 | 1 | 1 | 4 | 26 | 32 | 20 | 6 | 6 | 4 |
| 18 | 20 | 8/5.6 | 39 | 43 | 3 | 10 | 8 | 7 | 2 | 6 | 17 | 21 | 22 | 4 |
| 19 | 40 | 4/4 | 154 | 84 | <1 | 1 | 1 | 8 | 18 | 17 | 18 | 16 | 16 | 5 |
| 20 | 20 | 5.6/5.6 | 79 | 43 | <1 | 1 | 1 | 7 | 26 | 28 | 15 | 9 | 9 | 4 |
| 21 | 40 | 5.6/5.6 | 79 | 43 | <1 | <1 | <1 | 5 | 22 | 37 | 16 | 10 | 8 | 1 |
| 22 | 20 | 8/8 | 39 | 21 | 1 | 2 | 1 | 3 | 6 | 20 | 15 | 25 | 23 | 4 |
| 23 | 40 | 8/8 | 39 | 21 | <1 | <1 | <1 | <1 | <1 | 9 | 51 | 16 | 16 | 7 | a/b: Nozzle diameter for gas-vapor mixture/nozzle diameter for cooling gas

What is claimed is:

1. In a process for the fractional desublimation of vapor-phase solids from a gas-vapor mixture with a cooling gas, the improvement comprising passing the gas-vapor mixture, and the cooling gas into direct contact at high flow velocities, using a pair of coaxially aligned, opposing nozzles, one of said nozzles delivering said gas-vapor mixture and the other of said nozzles delivering said cooling gas, said nozzles having exit planes perpendicular to the nozzle axis, and adjusting the flow so that the mixture temperature of the resultant combined stream is below the sublimation temperature of the desired solid and above the sublimation temperatures of the by-products.

2. A process according to claim 1, wherein the flow velocities of the gas-vapor mixture and of the cooling gas are from 10 to 200 m/s.

3. A process according to claim 2, wherein said cooling gas is air.

4. A process according to claim 3, wherein the solid to be desublimed is pyromellitic dianhydride.

5. A process according to claim 2, wherein the solid to be desublimed is pyromellitic dianhydride.

6. A process according to claim 1, wherein the flow velocity of the gas-vapor mixture is 30–160 m/s and that of the cooling gas is 20–100 m/s.

7. A process according to claim 1, wherein said cooling gas is oxygen and/or nitrogen and/or carbon dioxide and/or carbon monoxide.

8. A process according to claim 1, wherein said cooling gas is air.

9. A process according to claim 1, wherein the solid to be desublimed is pyromellitic dianhydride.

10. In a desublimator, the improvement which comprises a pair of coaxially aligned opposing nozzles disposed within said desublimator, one of said nozzles delivering a gas-vapor mixture and the other of said nozzles delivering a cooling gas, the nozzles having exit planes perpendicular to the nozzle axis, and the nozzle orifices having a width of about 2 to 12 mm.

11. A desublimator according to claim 10, wherein the width of said nozzle orifice is about 4 to 8 mm.

12. Apparatus according to claim 11, the nozzle for the gas-vapor being spaced from the opposing nozzle for the cooling gas by 20–50 mm.

13. A desublimator according to claim 10 wherein the two nozzles have the same shape and same orifice cross section size and said nozzles oppose each other throughout the entire cross section thereof.

14. Apparatus according to claim 10, the nozzle for the gas-vapor being spaced from the opposing nozzle for the cooling gas by 2–100 mm.

15. Apparatus according to claim 10, wherein at least the interior surface of the nozzle for the gas-vapor mixture consists essentially of copper, silver or aluminum.

16. Apparatus according to claim 10 wherein the nozzle for the gas-vapor mixture is electrically heated.

17. Apparatus according to claim 10, said nozzle for the gas-vapor mixture being equipped with collar means.

18. Apparatus according to claim 17, said collar means being spaced from the nozzle axis by 4–16 mm and having an axial width of 4 to 20 mm.

19. Apparatus according to claim 17, said collar means being spaced from the nozzle axis by 6–12 mm and having an axial width of 8 to 12 mm.

20. Apparatus according to claim 10, comprising a multiplicity of nozzle orifice pairs arranged side-by-side.

21. A desubliminator according to claim 10, wherein said nozzle orifices are round in shape and said width refers to the diameter of said orifices.

22. A desubliminator according to claim 10, wherein said nozzle orifices are polygonal in shape and said width refers to the diagonal of said orifices.

23. A desubliminator according to claim 10, wherein said nozzle orifices are slotted in shape.

24. A process for the fractional desublimation of vapor-phase solids from a gas-vapor mixture with a cooling gas, the improvement comprising passing the gas-vapor mixture, and the cooling gas into direct contact at high flow velocities, using a pair of coaxially aligned, opposing nozzle means, each of said pair of nozzle means comprising a plurality of juxtaposed nozzles, one of said nozzle means delivering said gas-vapor mixture and the other of said nozzle means delivering said cooling gas, said nozzles having exit planes perpendicular to the nozzle axis, and adjusting the flow so that the mixture temperature of the resultant combined stream is below the sublimation temperature of the desired solid and above the sublimation temperatures of the by-products.

25. A process according to claim 1, wherein said fractional desublimation is conducted in a desublimator having wall surfaces surrounding said exit planes, and wherein the flow velocities and resultant rates of cooling are regulated so that the desired solids are entirely desublimed at the desublimation temperature before any substantial contact of the gas-vapor mixture with said wall surfaces

* * * * *